(12) United States Patent
Harding et al.

(10) Patent No.: US 6,701,615 B2
(45) Date of Patent: Mar. 9, 2004

(54) INSPECTION AND SORTING SYSTEM AND METHOD FOR PART REPAIR

(75) Inventors: Kevin George Harding, Niskayuna, NY (US); John William Devitt, Clifton Park, NY (US); Nelson Raymond Corby, Jr., Scotia, NY (US); Kristina Helena Valborg Hedengren, Schenectady, NY (US)

(73) Assignee: General Electric Company, Niskayuna, NY (US)

(*) Notice: Subject to any disclaimer, the term of this patent is extended or adjusted under 35 U.S.C. 154(b) by 90 days.

(21) Appl. No.: 09/683,981

(22) Filed: Mar. 8, 2002

(65) Prior Publication Data

US 2003/0167616 A1 Sep. 11, 2003

(51) Int. Cl.$^7$ .................................................. B23P 6/00
(52) U.S. Cl. .............. 29/889.1; 29/402.07; 29/402.18; 29/402.19; 29/407.04; 29/702
(58) Field of Search ............................. 29/889.1, 889.7, 29/402.18, 402.19, 402.05, 402.06, 402.07, 407.01, 407.04, 702, 703; 700/110

(56) References Cited

U.S. PATENT DOCUMENTS

| | | | |
|---|---|---|---|
| 4,787,549 A | | 11/1988 | Matay et al. |
| 5,152,058 A | | 10/1992 | Legros |
| 5,216,808 A | * | 6/1993 | Martus et al. ............. 29/889.1 |
| 5,285,572 A | * | 2/1994 | Rathi et al. ............... 29/889.1 |
| 5,656,786 A | * | 8/1997 | Curtis et al. .............. 73/865.8 |
| 5,913,555 A | * | 6/1999 | Richter et al. ............ 29/889.1 |
| 5,917,726 A | * | 6/1999 | Pryor ............................ 700/95 |
| 6,195,891 B1 | * | 3/2001 | Chen et al. ................ 29/889.1 |
| 6,380,512 B1 | * | 4/2002 | Emer ......................... 29/889.1 |
| 6,524,395 B1 | * | 2/2003 | Devine, II ................. 29/889.1 |
| 6,543,134 B2 | * | 4/2003 | Meier ........................ 29/889.1 |
| 6,594,533 B2 | * | 7/2003 | Phillips et al. .............. 700/90 |
| 2002/0091459 A1 | * | 7/2002 | Meier ........................ 29/889.1 |

OTHER PUBLICATIONS

Application No. 09/681,230 (RD–27,602), Ann M. Phillips et al., filed Mar. 02, 2001.

* cited by examiner

*Primary Examiner*—David P. Bryant
(74) *Attorney, Agent, or Firm*—Penny A. Clarke; Patrick K. Patnode

(57) ABSTRACT

An inspection and sorting system for part repair includes at least one sensor for inspecting a part. The sensor is configured to obtain inspection data for the part. A comparison module is configured to receive the inspection data, to generate a repair profile for the part using the inspection data, and to compare the repair profile with a baseline to arrive at a repair recommendation for the part. A method includes inspecting a part with at least one sensor to obtain preliminary inspection data for the part. The method further includes generating a preliminary repair profile from the preliminary inspection data, comparing the preliminary repair profile with a baseline, and arriving at a repair recommendation for the part based on the comparison.

56 Claims, 3 Drawing Sheets

INSPECTION AND SORTING SYSTEM AND METHOD FOR PART REPAIR

BACKGROUND OF INVENTION

The invention relates generally to an inspection and sorting system and method for part repair and, more particularly, to an inspection and sorting system and method for turbine blade repair.

Turbine blades are subjected to wear and damage during use necessitating their repair. Blade repair is generally both expensive and time consuming, involving extensive cleaning, grinding, welding, reshaping, finishing, and coating steps. Currently, repair operations begin with subjective observations by an operator as to the nature and the extent of the repair needed. Incomplete information at the initial inspection stage can lead to extensive rework, incomplete repair, or repair work being performed on irreparable parts. For example, extensive repairs might be made to a turbine blade requiring little rework, expending considerable unnecessary labor at a significant cost, based on the inspector's overestimation of the damage to the blade. Alternatively, time consuming repair processes might be performed on an extensively damaged turbine blade that the inspector incorrectly determined to be repairable. The latter scenario is particularly costly as several days of labor can be squandered on a scrap turbine blade.

In addition, current inspection processes exhibit operator variability based on both the operator's experience and subjective judgment. Not only is the initial inspection of the turbine blade subject to operator error, but the decision as to whether the turbine blade can and should be repaired is also subjective. This subjectivity produces inconsistent decision making both between different operators at a given repair facility and between different facilities, and can result, for example, in the refusal to repair all but the most minimally damaged turbine blades at one repair facility. Alternatively, another repair facility might attempt to repair even excessively damaged turbine blades. While the former repair facility foregoes realizable profits by neglecting to repair repairable turbine blades, the latter repair facility accrues avoidable losses by attempting to repair turbine blades that are either beyond repair or that only can be repaired at a loss.

An additional problem with current inspection processes for turbine blade repair is that inspection is generally limited to before and after the repair process. For example, initial and final visual inspections are performed before and after the repair process. The initial and final inspections may also be supplemented by fluorescent penetrant inspection to detect cracks in the coatings on the turbine blade and to confirm their removal, respectively. However, inspections are not generally performed during the often lengthy repair process. Consequently, current inspection processes fail to detect damage to the turbine blade caused by repair steps, such as grinding. Thus, under current practices a turbine blade damaged beyond repair by grinding will be processed to completion, producing a scrap turbine blade at significant labor and time costs.

It would therefore be desirable to provide an inspection and sorting system and method for turbine blade repair that would replace the current subjective observations with a quantitative assessment of the nature and the extent of the repair needed. It would further be desirable for the inspection and sorting system and method to replace the subjective decision making process as to whether a turbine blade should or should not be repaired with an objective process based on both the damage to the turbine blade and the anticipated cost of the repair. In addition, it would be desirable for the inspection and sorting system and method to monitor the turbine blade at different stages throughout the repair process to assess the likelihood and cost of repairing the turbine blade.

SUMMARY OF INVENTION

Briefly, in accordance with one embodiment of the present invention, an inspection and sorting system for part repair includes at least one sensor for inspecting a part. The sensor is configured to obtain inspection data for the part. The inspection and sorting system further includes a comparison module configured to receive the inspection data, to generate a repair profile for the part using the inspection data, and to compare the repair profile with a baseline to arrive at a repair recommendation for the part.

In accordance with another embodiment, a method is disclosed and includes inspecting a part with at least one sensor to obtain preliminary inspection data for the part. The method further includes generating a preliminary repair profile from the preliminary inspection data, comparing the preliminary repair profile with a baseline, and arriving at a repair recommendation for the part based on the comparison.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
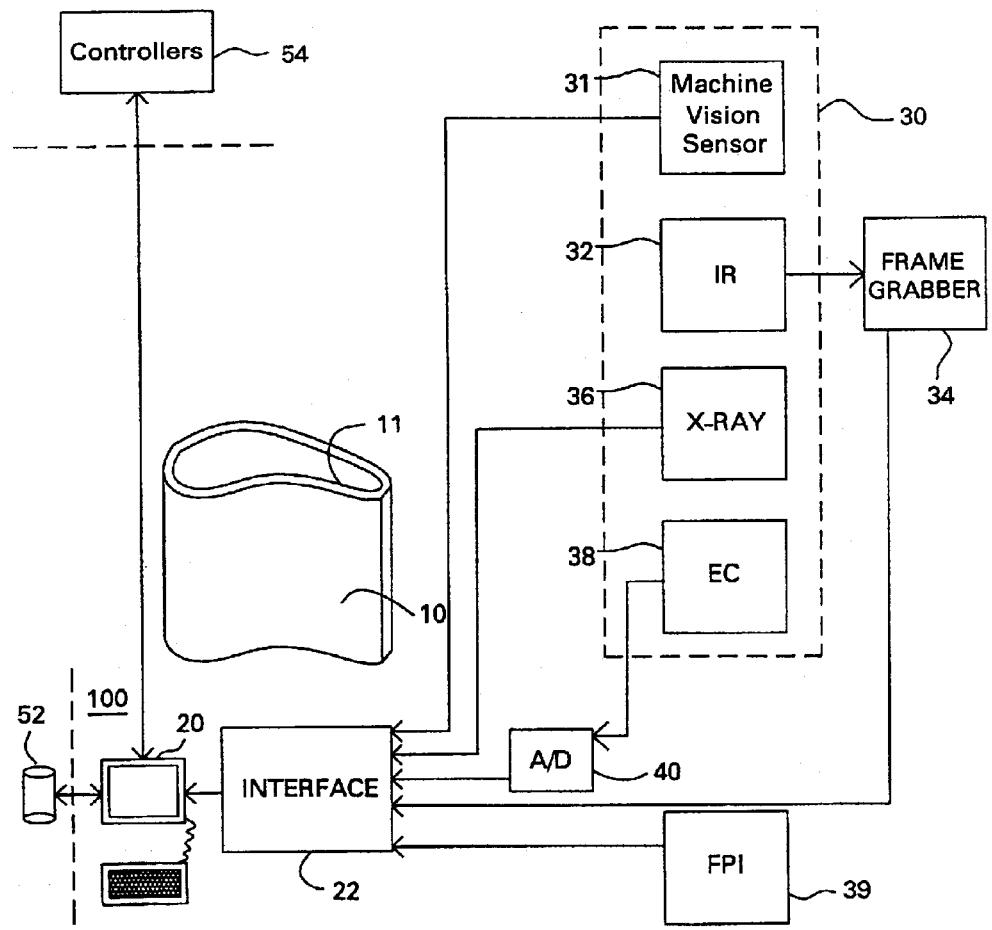
FIG. 1 depicts an inspection and sorting system of the invention in block form.

An inspection and sorting system 100 (or "system 100") for part repair will be described with reference to FIG. 1. System 100 includes at least one sensor 31, 32, 36, 38, or 39 for inspecting a part 10. The sensor is generically indicated as sensor 30 herein, may include at least one of the above sensors, and is configured to obtain a set of inspection data for part 10. As shown in FIG. 1, exemplary parts 10 include a turbine airfoil (also indicated by reference numeral 10), and one exemplary part is a turbine blade (not shown in entirety but also designated by reference numeral 10).

Inspection and sorting system 100 further includes a comparison module 20 configured to receive the inspection data, to generate a repair profile for part 10 using the inspection data, and to compare the repair profile with a baseline to arrive at a repair recommendation for the part. An exemplary repair recommendation indicates whether part 10 should be repaired, scrapped, or requires no repairs, based on the comparison. An exemplary comparison module 20 is a computer (also indicated by reference numeral 20). More particularly, computer 20 may be connected to sensor 30 by a computer interface 22, as illustrated in FIG. 1. One exemplary computer interface 22 is a BUSS. Another interconnection method is a wireless connection, which is particularly useful, for example, for a factory implementation.

It should be noted that the present invention is not limited to any particular computer for performing the processing tasks of the invention. The term "computer," as that term is used herein, is intended to denote any machine capable of performing the calculations, or computations, necessary to perform the tasks of the invention. The term "computer" is intended to denote any machine that is capable of accepting a structured input and of processing the input in accordance with prescribed rules to produce an output. It should also be noted that the phrase "configured to" as used herein means that computer 20 is equipped with a combination of hardware and software for performing the tasks of the invention, as will be understood by those skilled in the art.

Figure 2:
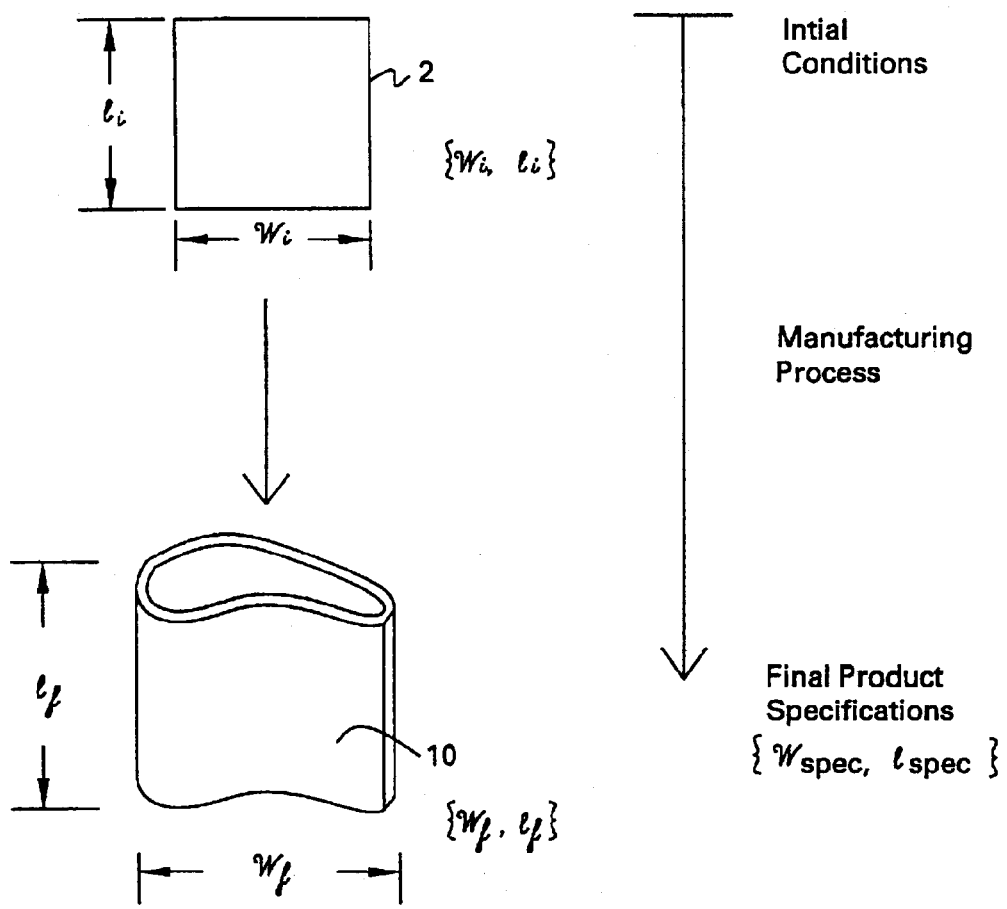
FIG. 2 depicts a manufacturing process in a simplistic form.
Figure 3:
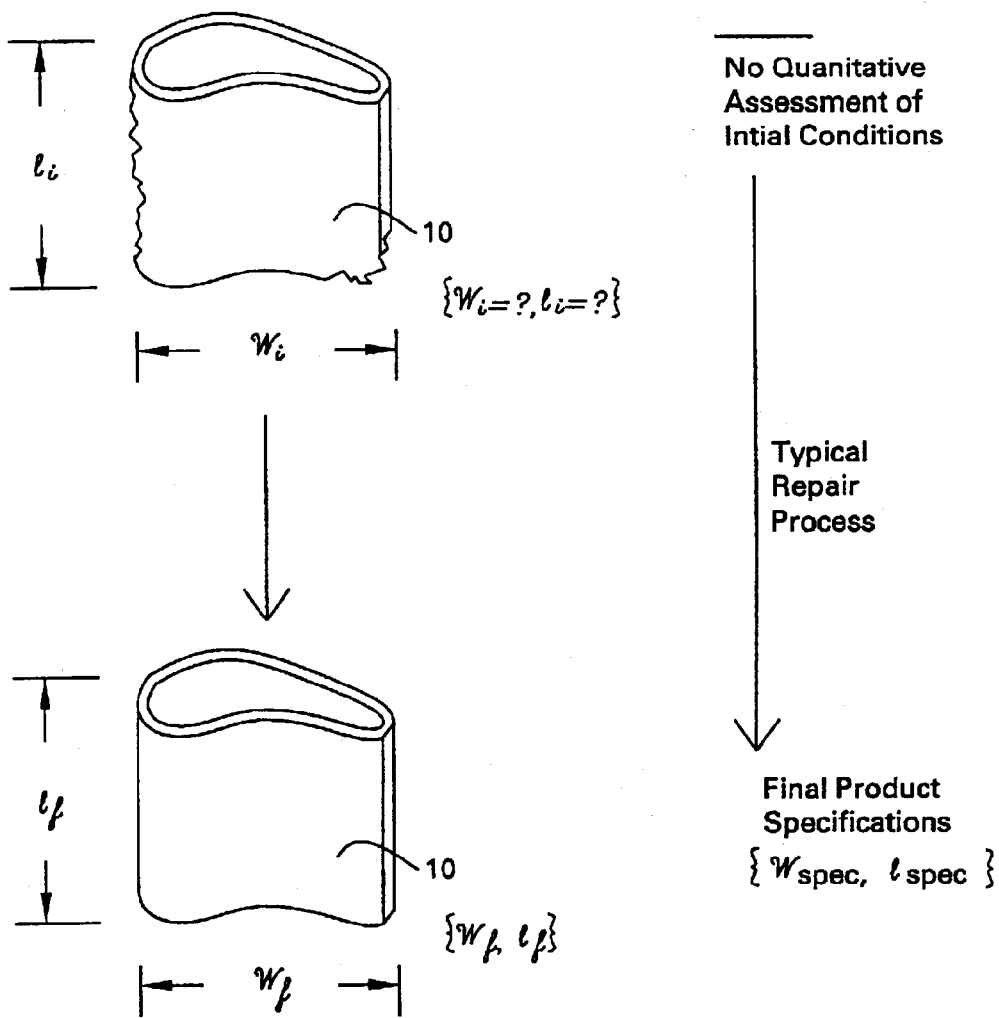
FIG. 3 depicts a repair process in a simplistic form.

One fundamental difference between repair and manufacturing operations is that manufacturing involves well defined sets of initial and final conditions, as simplistically illustrated in FIGS. 2 and 3 as width and length. Because the initial width and length $\{w_i, l_i\}$ of a starting piece 2 and specified width and length $\{w_{spec}, l_{spec}\}$ of a blade 10 are known for a manufacturing process (shown as formation of turbine airfoil 10), the manufacturing process can be designed to produce turbine airfoil 10 having final width and length $\{w_f, l_f\}$ that meet the specified width and length $\{w_{spec}, l_{spec}\}$, as shown in FIG. 2. However, for typical repair processes the initial conditions (for this simple example $\{w_i, l_i\}$) are unquantified, as indicated in FIG. 3. Moreover, the range of initial conditions that can yield a satisfactory repaired part 10 at an acceptable cost are also unquantified. Consequently, operators must rely on experience and engineering judgement to determine whether part 10 can be repaired at an acceptable cost.

In order to overcome this shortcoming of typical repair processes, comparison module 20 is configured to compare the repair profile with the baseline to arrive at a repair recommendation for part 10, as stated above. According to a particular embodiment, the baseline includes a historical repair database. One exemplary historical repair database is stored in comparison module 20 and includes repair data for parts 10 that have been repaired previously. Exemplary repair data include preliminary (before repair) values, intermediate values (in between repair steps such as grinding and welding), and final (after repair) values of parameters being measured by sensor 30, for example dimensions, and number, location, and size of flaws in part, such as cracks. Other exemplary repair data include repair cost, whether repair was successful, and part 10 characteristics, such as specifications, tolerances, and material properties. Further exemplary repair data include customer identity and customer performance criteria, such as cycles, hours, and fuels. As used here, the term "repair data" includes individual data points D, averaged data points $D_{ave}$, and ave ranges of data points $(D_0–D_N)$ Comparison of the repair profile, which is generated from the inspection data obtained using sensor 30, with the historical repair database provides a quantitative assessment as to whether part 10 should be repaired. For example, if the inspection data falls within a range of historical repair data that resulted in successful, profitable repairs, the repair recommendation is to repair part 10. On the contrary, if the inspection data coincides with historical repair data for irreparable parts or parts repaired with unacceptable repair costs, the repair recommendation is to reject part 10. In this manner, the decision as to whether to repair part 10 is quantified according to system 100 of the invention, providing a significant improvement over the operator dependent decision making process of the prior art.

According to another particular embodiment, the baseline is obtained using a predictive repair model. An exemplary predictive repair model is implemented using comparison module 20 (e.g., computer 20). More particularly, an exemplary predictive repair model is a predictive algorithm implemented by software run on comparison module 20. Exemplary predictive algorithms are obtained based on historical repair data by standard mathematical modeling techniques. In order to generate the baseline, historical repair data for various parameters characterizing part 10 can be input to comparison module 20, for example the dimensions and material properties. The comparison module 20 then uses the predictive algorithm to generate the baseline from the historical repair data, for example a range or an upper or lower limit for the parameter(s) being measured by sensor 30. As with the historical repair database, comparison of the repair profile, which is generated from the inspection data obtained using sensor 30, with the baseline obtained using the predictive repair model provides a quantitative assessment as to whether part 10 should be repaired. Accordingly, this embodiment also improves over the prior art processes by replacing the existing operator-dependent, qualitative decision-making process, with a quantitative determination.

In order to update the comparison of the repair profile with the baseline, comparison module 20 is further configured to access updated repair data, such as current cost data, and to revise the repair recommendation based on the updated repair data, according to a more particular embodiment. For example, comparison module 20 is linked in real-time to a current cost database 52, as indicated in FIG. 1. Here "updated repair data" means repair data obtained after the historical repair data, for example updated repair cost information or updated customer performance criteria. The repair recommendation is revised, for example, by modifying the baseline using comparison module 20 and the updated repair data. Beneficially, by linking comparison module 20 to updated repair data, comparison module 20 can arrive at cost effective repairs based on the updated cost data, instead of relying on potentially outmoded cost data.

Repair facilities are not static environments but rather repair stations, such as lathes and milling machines, go on and off-line, and throughputs at each station change, for example due to operator variability or availability. Accordingly, for another embodiment of system 100, comparison module 20 is further configured to access repair facility data and to revise the repair recommendation based on the repair facility data. Exemplary repair facility data includes whether repair stations are operating. More particularly, comparison module 20 is linked in real-time to at least one numerical controller 54 for the repair facility, as indicated in FIG. 1. For example, comparison module is lined to a numerical controller 54 for a milling machine (not shown). Another means by which repair facility data can be accessed is by accessing a report containing such data. The repair recommendation is revised, for example, by modifying the baseline using comparison module 20 and the repair facility data. In this manner, repair recommendations are correlated with current problems and trends for the repair facility.

As indicated in FIG. 1, a number of sensors 30 are suitable for use in system 100, including a machine vision sensor 31, an infrared camera 32, an x-ray imager 36, an eddy current inspection module 38, and a fluorescent penetrant inspection module 39. Each of these sensors 30 will be discussed in turn.

According to one embodiment, sensor 30 comprises a machine vision sensor 31 configured to obtain at least one visual image of part 10. For this embodiment, the inspection data includes the visual image, and the repair profile includes a visual profile generated from the visual image.

One exemplary machine vision sensor 31 is a video camera (not shown), for example a SmartImage Sensor from DVT Corp, Norcross, Ga. The visual image(s) obtained using machine vision sensor 31 desirably provide information regarding surface features such as cracks, holes, and discoloration. According to a more particular embodiment, comparison module 20 (e.g., computer 20) is configured to analyze the visual image to obtain the visual profile for part 10. For example, software for analyzing (for example, segmenting) the visual images obtained using the video camera, is installed on comparison module 20.

In order to obtain a more complete repair profile, system 100 further includes either an x-ray imager 36 or an infrared sensor 32. Such sensors desirably provide information regarding the internal structure of part 10, for example regarding cracks and the state of any internal passages (not shown) within part 10. According to one embodiment, system 100 further includes x-ray imager 36 configured to obtain at least one x-ray image of part 10. For this embodiment, the repair profile further includes an x-ray profile for part 10 generated from the x-ray image. Desirably, the x-ray profile provides information regarding any cracks in part 10, the wall thickness of part 10 (where applicable), and internal damage to part 10, such as to any internal passages thereof. By combining the visual profile with the x-ray profile, comparison of the repair profile with the baseline permits a more accurate determination of the repair recommendation for part 10 because the repair profile includes not only general visual information (visual image) but also information about the internal state of part 10 (x-ray image), such as crack location and depth, as well as coating integrity, where applicable.

In order to analyze the inspection data in "real time," x-ray imager 36, according to a more particular embodiment, is a digital x-ray imager (also indicated by reference numeral 36). For this embodiment, the x-ray image is a digital x-ray image, and comparison module 20 (e.g., computer 20) is configured to analyze the x-ray image to generate the x-ray profile of part 10. Exemplary x-ray imagers include a computed tomography ("CT") scanner and a digital x-ray panel. Beneficially, a CT scanner can be used to obtain multiple views of part 10, thus providing additional information regarding the internal state of part 10, such as wall and coating thickness.

Thermal radiography can alternately or additionally be employed to examine internal damage to part 10. Accordingly another embodiment of system 100 further includes an infrared camera 32 configured to obtain an infrared image of part 10. Exemplary infrared cameras 32 include a microbolometer based system and a sensor array based camera, such as a HgCtTe sensor array based camera. For this embodiment, the repair profile further includes an infrared profile generated from the infrared image. Alternatively, an infrared radiometer (also indicated by reference numeral 32) is employed. Infrared radiometry typically involves flashing part 10 and a reference (not shown) with a flash lamp (not shown) and capturing the resulting infrared image with an infrared radiometer 32. Control electronics (not shown) are provided in these exemplary references to control infrared radiometer 32 and the flash lamp. According to one infrared imaging technique, part 10 is scanned with a laser (not shown), such as a Nd:YAG laser, and the infrared image is captured with infrared camera 32. Both techniques have advantages. For example, using flash lamps is faster and provides a full area view of part 10, whereas scanning part 10 with the laser may provide improved crack depth resolution.

Similar to the benefits discussed above with respect to x-ray imaging, by combining the visual profile with the infrared profile, comparison of the repair profile with the baseline permits a more accurate determination of the repair recommendation for part 10. Namely, the repair profile for this embodiment includes general visual information (visual image), cleanliness information (infrared image), such as the presence of oxides on part 10, and information about the internal state of part 10 (infrared image), such as wall thickness, and crack location and depth, where applicable.

In order to analyze the inspection data in "real time," according to a more particular embodiment, system 100 further includes an infrared image converter 34, such as a frame grabber 34, configured to digitize the infrared image to supply a digital infrared image to computer 20. For this embodiment, comparison module 20 is configured to analyze the digital infrared image to generate the infrared profile of part 10.

In order to detect cracks in part 10, for example to detect cracks in a dovetail (not shown) of turbine blade 10, system 100 according to another embodiment includes a fluorescent penetrant inspection (FPI) module 39 configured to obtain a set of FPI data for part 10. For this embodiment, the repair profile further includes an FPI profile generated from the FPI data. Desirably, the repair profile for this embodiment combines the visual profile with the FPI profile, which includes information regarding the location and size of flaws, such as cracks, in part 10. By "configured to obtain FPI data," it is meant that FPI module 39 includes means for treating part 10 with a liquid fluorescent penetrant ("liquid FP"), such as a container of the liquid FP (not shown) or a liquid FP sprayer (not shown), as well as means for obtaining FPI images of part 10 (either transitory, such as visual images obtained by operators themselves, or more permanent, such as FPI images obtained using a camera). According to a specific embodiment, FPI module 39 includes a machine vision sensor (not expressly shown) to obtain FPI images of part 10 treated with the liquid FP. For example, machine vision sensor 31 could also be employed in FPI module 39. Alternatively, the FPI data is obtained by examination of part 10 by an operator, after it has been treated with the FP liquid, and more particularly is input into a graphical interface for analysis.

According to a more particular embodiment, system 100 further comprises quantification means for generating the FPI profile. Where FPI images are obtained using means such as machine vision sensor 31, the FPI profile is preferably generated in an automated fashion, such as using comparison module 20 (e.g., computer 20), which is equipped with software to identify and quantify flaws captured in the FPI image. Alternatively, flaws are identified and quantified using operators, who either examine the FPI images or part 10 itself. As noted above, for the latter operator identification and quantification, the FPI data is input into a graphical interface, for exam pie.

In order to detect and quantify flaws in part 10, such as cracks in a tip of turbine blade 10, system 10 further includes an eddy current inspection module 38 configured to obtain a set of eddy current data for part 10. For this embodiment, the repair profile further includes an eddy current profile generated from the eddy current data. Because exemplary eddy current profiles identify the location and size of flaws in part 10, such as cracks, combination of the visual and eddy current profiles permits a more accurate determination of the repair recommendation for part 10.

Exemplary eddy current inspection modules 38 include eddy current probes (not shown). Traditional eddy current probes include a drive coil (not shown) that applies a drive pulse to part 10 and a magnetic field sensor (not shown) to receive a response signal from part 10. The response signal reflects the secondary magnetic field generated within part 10 in response to the eddy currents induced in part 10 by the drive pulse. Another exemplary eddy current probe is a single eddy current array probe (SECAP) (not shown). SECAPs are single, conducting coils formed on a flexible substrate by known photolithographic methods. A variety of conductive materials, such as copper, silver, and gold are used to form SECAPS. In order to efficiently scan a larger area of part 10, eddy current probes comprising eddy current array probes (ECAPs) are employed, according to a specific embodiment of the invention. Briefly, ECAPs are arrays of conducting coils disposed on dielectric substrates. ECAPs are advantageous for applications involving large scanning areas and increased sensitivity.

In order to analyze the inspection data in "real time," according to a more particular embodiment, system 100 further includes an eddy current converter 40 configured to digitize the eddy current data to supply digital eddy current data to comparison module 20 (e.g., computer 20). One exemplary eddy current converter 40 is an analog-to-digital converter 40, as indicated in FIG. 1. For this embodiment, comparison module 20 is further configured to analyze the digital eddy current data to generate the eddy current profile. For example, comparison module 20 is equipped with software to extract the location and size of flaws, such as cracks, in part 10 from the digital eddy current data.

According to another embodiment of system 100, comparison module 20 includes a neural network (not expressly shown) configured to generate the baseline from a set of historical repair data and to compare the repair profile with the baseline to arrive at a repair recommendation for part 10. Exemplary neural networks include one or more computer programs having a set of adaptive nodes or analysis rules that govern the analysis performed using the computer program. By "adaptive," it is meant that the nodes or analysis rules are modified over their use by changes to external inputs, such as from training images in a "learning process." One advantage of this embodiment is that the neural network is adaptive, employing rule based logic, for example in the form of priorities of a knowledge tree to convert an unpredictable input (the inspection data) into a predictable output (decision to repair). According to a more particular embodiment, neural network is further configured to receive and add the inspection data to the historical repair data to provide a dynamic historical repair database. For the latter embodiment, the neural network is further configured to generate the baseline from the dynamic historical repair database.

According to a particular embodiment of system 100, part 10 is a turbine blade 10 and includes an airfoil (also indicated by reference numeral 10). In order to more fully exploit system 100, comparison module 20 is further configured to determine the extent of the necessary repairs, after determining that part 10 requires repairs. More particularly, comparison module 20 is further configured to arrive at a stripping and recoating recommendation for part 10, for example whether part 10 should be stripped and recoated. Similarly, comparison module 20 is further configured to arrive at a crack repair recommendation for part 10, for example whether part 10 should undergo a crack repair process and, if so, to determine a length of the tip to be removed, for example by grinding.

According to an example embodiment, system 100 is an inspection and sorting system for turbine blade repair and includes machine vision sensor 31 configured to obtain at least one visual image of a turbine blade 10, the turbine blade comprising an airfoil 10. System 100 further includes computer 20 configured to receive the visual image, to generate a repair profile for the part using the visual image, and to compare the repair profile with a baseline to arrive at a repair recommendation for the turbine blade. Computer 20 is further configured to access repair facility data and updated repair data, and to revise the repair recommendation based on the repair facility data and the updated repair data. More particularly, computer 20 is further configured to revise the baseline using the repair facility data and the updated repair data.

Exemplary baselines include a historical repair database and a baseline obtained using a predictive repair model. In a particular embodiment, system 100 further includes digital x-ray imager 36. For this embodiment, computer 20 is configured to analyze a digital x-ray image of turbine blade 10 to generate the repair profile using the visual and digital x-ray images. For another embodiment, system 100 further includes infrared camera 32 and an infrared image converter (for example frame grabber 34 and A/D converter 40) configured to digitize an infrared image to supply a digital infrared image of turbine blade 10 to computer 20. For this embodiment, computer 20 is configured to analyze the digital infrared image to generate the repair profile using the visual and digital infrared images. For yet another embodiment, system 100 further includes eddy current inspection module 38 and eddy current converter 40 configured to digitize eddy current data to supply digital eddy current data to computer 20. For this embodiment, computer 20 is configured to analyze the digital eddy current data to generate the repair profile using the visual and digital eddy current data.

A method embodiment of the invention includes inspecting part 10 with at least one sensor 30 to obtain a set of preliminary inspection data for part 10. Exemplary preliminary inspection data includes visual, x-ray, and infrared data obtained before part 10 has been repaired. As noted above, one exemplary part 10 includes an airfoil 10, and more particularly is a turbine blade 10. The method further includes generating a preliminary repair profile from the preliminary inspection data, comparing the preliminary repair profile with a baseline, and arriving at a repair recommendation for part 10 based on the comparison. More particularly, the method determines whether part 10 should be repaired, scrapped, or requires no repairs, based on the comparison. According to one embodiment, the generation and comparison of the preliminary repair profile and the arrival at the repair recommendation for part 10 are performed using computer 20.

One exemplary baseline is the historical repair database, discussed above with respect to system 100. According to another embodiment, the method further includes obtaining the baseline using the predictive repair model, as discussed above with respect to system 100. According to yet another embodiment, the method further includes generating the baseline from a set of historical repair data using a neural network, as is also discussed above with respect to system 100. As explained above, comparison of the preliminary repair profile with the baseline advantageously replaces the current operator-dependent decision making process as to whether to repair part 10 with an objective, quantitative determination based on historical repair data.

To correlate repair recommendations with current problems and trends for the repair facility, the method according to a particular embodiment further includes accessing repair facility data, and revising the repair recommendation using the repair facility data. In one example, the repair facility is accessed in real-time, for example by linking comparison module 20 to numerical controller 54 in real-time. More particularly, the repair recommendation is revised by revising the baseline using the repair facility data, for example using computer 20. Similarly, to update the comparison of the repair profile with the baseline, the method according to another embodiment further includes accessing updated repair data, for example real-time accessing a current cost database, and revising the repair recommendation based on the updated repair data, for example by revising the baseline using the updated repair data.

According to a more particular embodiment, arriving at the repair recommendation for part 10 includes estimating a probability of repair $_{est}$ P and a cost of repair $C_{est}$, based on the comparison of the preliminary repair profile with the baseline. The estimated cost and probability of repair $C_{est}$, $P_{est}$ are then evaluated to determine whether the preliminary inspection data indicates a likelihood of satisfying a predetermined repair value $V_{pre}$, for example a fraction of an anticipated repair price or a fraction of a replacement cost for part 10. One exemplary evaluation includes determining whether the cost $C_{est}$ satisfies an equation:

$$C_{est} < P_{est} \cdot V_{pre}.$$

For this example, satisfaction of the equation indicates the likelihood that the inspection data satisfies the predetermined repair value $V_{pre}$.

In order to permit a detailed comparison of part 10 with the baseline, according to another embodiment, the method obtains the preliminary inspection data as follows. Part 10 is inspected with machine vision sensor 31 to obtain at least one preliminary visual image of part 10. Part 10 is further inspected with at least one of x-ray imager 36 and infrared camera 32, to obtain a set of preliminary internal inspection data for part 10. For this embodiment, the preliminary inspection data includes the preliminary visual image and the preliminary internal inspection data.

The inventive method is not limited to preliminary inspection and determination but rather is extendable to other stages of the repair process. According to another embodiment, the method further includes grinding part 10, if the repair recommendation based on the preliminary inspection data is to repair part 10. The method further includes inspecting part 10 with at least one sensor 30 to obtain a set of grinding inspection data for part 10, generating a grinding repair profile from the grinding inspection data, and comparing the grinding repair profile with a grinding baseline. The method refines the repair recommendation for part 10 based on the comparison with the grinding baseline, for example determining whether repairs to part 10 should continue based on this comparison.

Desirably, inspecting part 10 during or after grinding permits a quantitative determination as to whether part 10 should continue to be repaired, part 10 should be scrapped, or a subsequent repair process should be modified. This is beneficial because cracks can form during grinding, and excess material can be removed during grinding, rendering part 10 irreparable, at least on a cost-effective basis, or requiring downstream processes such as welding to be altered to repair part 10.

One exemplary grinding operation is grinding a tip 11 of an airfoil 10, to remove cracks from airfoil 10, for example using an abrasive wheel (not shown). The grinding inspection data can be obtained by inspecting part 10 either during or after the grinding operation. If part 10 is inspected during grinding, exemplary sensors are eddy current inspection module 38 and infrared camera 32. If part 10 is inspected after grinding, exemplary sensors are machine vision sensor 31 and at least one of eddy current inspection module 38, infrared camera 32, x-ray imager 36, and fluorescent penetrant inspection (FPI) module 39.

One exemplary grinding baseline includes the historical repair database, where the database further includes historical inspection data obtained during and/or after the grinding operation. Another exemplary grinding baseline is obtained using a grinding predictive model, which is similar to the repair predictive model discussed above. An exemplary grinding predictive model includes a predictive algorithm obtained based on historical repair data, including data obtained during or after grinding, using standard mathematical modeling techniques. According to another embodiment, the method further includes generating the grinding baseline from a set of historical repair data, including data obtained during or after grinding, using a neural network, as discussed above with respect to system 100. Advantageously, comparison of the grinding repair profile with the grinding baseline replaces the existing operator-dependent decision making process as to whether to continue repairing part 10 with an objective, quantitative determination based on historical repair data.

As with the preliminary inspection and grinding stages, it is useful to extend the inventive method to still other stages of the repair process. According to another embodiment, the method also includes building up part 10 by welding, if the refinement of the repair recommendation indicates continuing to repair part 10 based on the grinding repair profile. For example, a tip 11 of airfoil 10 is rebuilt by welding. The method further includes inspecting part 10 with at least one sensor 30 to obtain a set of welding inspection data for part 10, generating a welding repair profile from the welding inspection data, comparing the welding repair profile with a welding baseline, and refining the repair recommendation for part 10 based on the comparison with the welding baseline.

The welding inspection data can be obtained by inspecting part 10 either during or after welding. If part 10 is inspected during welding, one exemplary sensor is machine vision sensor 31, and exemplary welding inspection data includes one or more welding visual image of part 10. If part 10 is inspected after welding, exemplary sensors are machine vision sensor 31 and at least one of eddy current inspection module 38, infrared camera 32, x-ray imager 36, and fluorescent penetrant inspection (FPI) module 39.

One exemplary welding baseline includes the historical repair database, where the database further includes historical inspection data obtained during and/or after the welding operation. Other exemplary welding baselines are generated using a neural network from the historical repair data or obtained using a welding predictive model, which is similar to the grinding predictive model discussed above except that the predictive algorithm is obtained using historical repair data, including data obtained during and/or after welding. Comparison of the welding repair profile with the welding baseline advantageously provides an objective, quantitative decision making process based on historical repair data, as to whether to continue repairing part 10 after welding.

In the event that the refinement of the repair recommendation based on the welding repair profile indicates continuing to repair part 10, the method according to yet another embodiment further includes reshaping part 10. For example, where part 10 includes airfoil 10, reshaping includes grinding excess material added during welding, shaping tip 11 of airfoil 10 using a belt grinder, machining cooling passages (not shown) and other internal passages (not shown), and heat treating airfoil 10. More particularly, the method further includes inspecting part 10 with at least one sensor 30 to obtain a set of reshaping inspection data for part 10, generating a reshaping repair profile from the reshaping inspection data, comparing the reshaping repair profile with a reshaping baseline, and arriving at a recoating recommendation for part 10 based on the comparison with the reshaping baseline. Still more particularly, the method further includes recoating part 10 to obtain a repaired part, if the recommendation is to recoat part 10.

The reshaping inspection data can be obtained by inspecting part 10 either during or after reshaping. If part 10 is inspected during reshaping, one exemplary sensor is machine vision sensor 31. If part 10 is inspected after reshaping, exemplary sensors are machine vision sensor 31 and at least one of eddy current inspection module 38, infrared camera 32, x-ray imager 36, and fluorescent penetrant inspection (FPI) module 39.

One exemplary reshaping baseline includes the historical repair database, where the database further includes historical inspection data obtained during and/or after the reshaping operation. Another exemplary reshaping baseline is obtained using a reshaping predictive model, which is similar to the grinding and welding predictive models discussed above except that the predictive algorithm is obtained using a set of historical repair data that includes data obtained during or after reshaping. Yet another exemplary reshaping baseline is generated using a neural network from the historical repair data. Comparison of the reshaping repair profile with the reshaping baseline advantageously provides an objective, quantitative decision making process based on historical repair data, as to whether to recoat, further reshape, or discard part 10 after reshaping.

In order to determine whether a satisfactory repaired part has been obtained, the method according to another embodiment further includes inspecting part 10 with at least one sensor 30 to obtain a set of final inspection data for part 10, after part 10 is recoated. Exemplary sensors 30 include x-ray imager 36, infrared camera 32, and eddy current inspection module 38. The method further includes determining whether part 10 satisfies a repaired part profile based on the final inspection data. An exemplary repaired part profile is a set of specifications for part 10, such as dimensions, wall thickness, coating thickness, and absence of cracks and other flaws. Exemplary specifications are set by the applications for part 10 and additional customer requirements.

In the event that the repair recommendation indicates that any of the preliminary, grinding, and welding repair profiles do not satisfy their respective baselines, it may be cost-effective to modify downstream processes to repair part 10 instead of scrapping it. For that reason, the method according to another embodiment further includes determining whether at least one of the grinding, welding, and reshaping operations should be modified to produce a satisfactory repaired part, if the preliminary repair profile does not satisfy the baseline. Similarly, if the grinding repair profile does not satisfy the grinding baseline, the method of this embodiment further includes determining whether the welding or reshaping operations should be modified to produce a satisfactory repaired part. The method also includes determining whether the reshaping of part 10 should be modified, if the welding repair profile does not satisfy the welding baseline. For example, these determinations are made based on one or more of the following: visual inspection of part 10, and more particularly of a repaired portion of part 10, using machine vision sensor 31, a three dimensional shape of part 10 as determined by a laser profile as seen by machine vision sensor 31, one or more electrical profile signatures for part 10 as generated by eddy current inspection module 38, a time profile of thermal changes for part 10 obtained using infrared camera 32, one or more force or energy time profiles generated by monitoring the electrical power of the welding or grinding operation, or similar signatures as may be obtained using conventional methods of monitoring welding and grinding processes.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An inspection and sorting system for part repair comprising:
    at least one sensor for inspecting a part, said sensor being configured to obtain a plurality of inspection data for the part; and
    a comparison module configured to receive the inspection data, to implement a predictive repair model comprising a predictive algorithm to generate a baseline, to generate a repair profile for the part using the inspection data, and to compare the repair profile with the baseline to arrive at a repair recommendation for the part.

2. The inspection and sorting system of claim 1, wherein said comparison module is further configured to access a plurality of updated repair data and to modify the baseline by application of the predictive repair model to the updated repair data.

3. The inspection and sorting system of claim 2, wherein said comparison module is linked in real-time to a current cost database and the updated repair data comprises current cost data.

4. The inspection and sorting system of claim 1, wherein said comparison module comprises a neural network configured to apply the predictive algorithm to a plurality of historical repair data to generate the baseline and to compare the repair profile with the baseline to arrive at the repair recommendation for the part.

5. The inspection and sorting system of claim 4, wherein said neural network is further configured to receive and add the inspection data to the historical repair data to provide a dynamic historical repair database, and wherein said neural network is further configured to apply the predictive algorithm to the historical repair data from the dynamic historical repair database to generate the baseline.

6. The inspection and sorting system of claim 1, wherein said comparison module comprises a computer.

7. The inspection and sorting system of claim 6, wherein said at least one sensor comprises a machine vision sensor configured to obtain at least one visual image of the part, wherein the inspection data includes the visual image, and wherein the repair profile comprises a visual profile generated from the visual image.

8. The inspection and sorting system of claim 7, wherein said computer is configured to analyze the visual image to obtain the visual profile for the part.

9. The inspection and sorting system of claim 7, wherein said at least one sensor further comprises an x-ray imager configured to obtain at least one x-ray image of the part, wherein the repair profile further comprises an x-ray profile for the part generated from the x-ray image.

10. The inspection and sorting system of claim 9, wherein said x-ray imager comprises a digital x-ray imager, and the x-ray image comprises a digital x-ray image, wherein the inspection data includes the digital x-ray image, and wherein said computer is configured to analyze the x-ray image to generate the x-ray profile of the part.

11. The inspection and sorting system of claim 7, wherein said at least one sensor further comprises an infrared camera configured to obtain an infrared image of the part, and wherein the repair profile further comprises an infrared profile generated from the infrared image.

12. The inspection and sorting system of claim 11, wherein the infrared image is a digital infrared image, wherein the inspection data includes the infrared image, and wherein said computer is configured to analyze the infrared image to generate the infrared profile of the part.

13. The inspection and sorting system of claim 11, further comprising an infrared image converter configured to digitize the infrared image to supply a digital infrared image to said computer.

14. The inspection and sorting system of claim 7, wherein said at least one sensor further comprises a fluorescent penetrant inspection (FPI) module configured to obtain a plurality of FPI data for the part, wherein the repair profile further includes an FPI profile generated from the FPI data.

15. The inspection and sorting system of claim 14, further comprising quantification means for generating the FPI profile.

16. The inspection and sorting system of claim 7, wherein said at least one sensor further comprises an eddy current inspection module configured to obtain a plurality of eddy current data for the part, wherein the repair profile further includes an eddy current profile generated from the eddy current data.

17. The inspection and sorting system of claim 16, further comprising an eddy current converter configured to digitize the eddy current data to supply digital eddy current data to said computer, wherein said computer is further configured to analyze the digital eddy current data to generate the eddy current profile.

18. An inspection and sorting system for part repair comprising:
   at least one sensor for inspecting a part, said sensor being configured to obtain a plurality of inspection data for the part; and
   a comparison module configured to receive the inspection data, to generate a repair profile for the part using the inspection data, and to compare the repair profile with a plurality of repair data from a historical repair database to arrive at a repair recommendation for the part.

19. The inspection and sorting system of claim 18, wherein said comparison module is further configured to access repair facility data and to revise the repair recommendation based on the repair facility data.

20. The inspection and sorting system of claim 19, wherein said comparison module is linked in real-time to at least one numerical controller for the repair facility.

21. The inspection and sorting system of claim 18, wherein the part comprises an airfoil.

22. The inspection and sorting system of claim 21, wherein the part is a turbine blade.

23. The inspection and sorting system of claim 21, wherein said comparison module is further configured to arrive at a stripping and recoating recommendation for the part, if the repair recommendation is to repair the part.

24. The inspection and sorting system of claim 23, wherein said comparison module is further configured arrive at a crack repair recommendation for the part, if the repair recommendation is to repair the part.

25. The inspection and sorting system of claim 24, wherein the airfoil has a tip, and wherein said comparison module is further configured to determine a length of the tip to be removed, if the crack repair recommendation is to perform a crack repair process on the part.

26. A method comprising:
   inspecting a part with at least one sensor to obtain a plurality of preliminary inspection data for the part;
   generating a preliminary repair profile from the preliminary inspection data;
   comparing the preliminary repair profile with a baseline; and
   arriving at a repair recommendation for the part based on said comparison, said arrival at the repair recommendation comprising:
      estimating a probability of repair $P_{est}$ and a cost of repair $C_{est}$, based on said comparison, and
      evaluating the cost and probability of repair $C_{est}$, $P_{est}$, to determine whether the preliminary inspection data indicates a likelihood of satisfying a predetermined repair value $V_{pre}$.

27. The method of claim 26, wherein the part comprises an airfoil.

28. The method of claim 27, wherein the part is a turbine blade.

29. The method of claim 26, wherein said generation, said comparison, and said arrival at the repair recommendation are performed using a computer.

30. The method of claim 29, further comprising:
   grinding the part, if the repair recommendation is to repair the part;
   inspecting the part with at least one sensor to obtain a plurality of grinding inspection data for the part;
   generating a grinding repair profile from the grinding inspection data;
   comparing the grinding repair profile with a grinding baseline; and
   refining the repair recommendation based on said comparison with the grinding baseline.

31. The method of claim 30 further comprising:
   building up the part by welding, if the repair recommendation is to continue repairing the part;
   inspecting the part with at least one sensor to obtain a plurality of welding inspection data for the part;
   generating a welding repair profile from the welding inspection data;
   comparing the welding repair profile with a welding baseline; and
   refining the repair recommendation based on said comparison with the welding baseline.

32. The method of claim 31, further comprising reshaping the part, if the repair recommendation is to continue repairing the part.

33. The method of claim 32, further comprising:
   inspecting the part with at least one sensor to obtain a plurality of reshaping inspection data for the part;
   generating a reshaping repair profile from the reshaping inspection data;
   comparing the reshaping repair profile with a reshaping baseline; and
   arriving at a recoating recommendation for the part based on said comparison with the reshaping baseline.

34. The method of claim 33, further comprising recoating the part to obtain a repaired part, if the recoating recommendation is to recoat the part.

35. The method of claim 34, further comprising:

inspecting the part with at least one of an x-ray imager, an infrared radiometer, and an eddy current inspection module to obtain a plurality of final inspection data for the part, said inspection being performed after said recoating operation; and determining whether the part satisfies a repaired part profile based on the final inspection data.

36. The method of claim 33, wherein the baseline, the grinding baseline, the welding baseline and the reshaping baseline comprise a historical repair database comprising historical inspection data.

37. The method of claim 36, further comprising:

accessing repair facility data; and revising the repair recommendation using the repair facility data.

38. The method of claim 36, further comprising:

accessing updated repair data; and revising the repair recommendation based on the updated repair data.

39. The method of claim 33, further comprising:

obtaining the baseline using a predictive repair model;

obtaining the grinding baseline using a grinding predictive model;

obtaining the welding baseline using a welding predictive model; and obtaining the reshaping baseline using a reshaping predictive model.

40. The method of claim 39, further comprising:

accessing repair facility data; and revising the repair recommendation using the repair facility data.

41. The method of claim 39, further comprising:

accessing updated repair data; and revising the repair recommendation based on the updated repair data.

42. The method of claim 33, further comprising generating the baseline, the grinding baseline, the welding baseline, and the reshaping baseline from a plurality of historical repair data using a neural network.

43. The method of claim 33, further comprising:

determining whether at least one of said grinding the part, said build up of the part, and said reshaping of the part should be modified to produce a satisfactory repaired part, if the preliminary repair profile does not satisfy the baseline;

determining whether at least one of said build up and said reshaping of the part should be modified to produce the satisfactory repaired part, if the grinding repair profile does not satisfy the grinding baseline; and determining whether said reshaping of the part should be modified to produce the satisfactory repaired part, if the welding repair profile does not satisfy the welding baseline.

44. The method of claim 33, wherein said inspection to obtain the preliminary inspection data comprises:

inspecting the part with a machine vision sensor to obtain at least one preliminary visual image of the part, and inspecting the part with at least one of an x-ray imager and an infrared camera to obtain a plurality of preliminary internal inspection data for the part, wherein the preliminary inspection data comprises the preliminary visual image and the preliminary internal inspection data.

45. The method of claim 44, wherein said inspection to obtain the grinding inspection data is performed after said grinding operation and comprises:

obtaining at least one grinding visual image of the part, and inspecting the part with at least one of the x-ray imager, the infrared camera, an eddy current inspection module, and a fluorescent penetrant inspection (FPI) module to obtain a plurality of grinding internal inspection data for the part, wherein said grinding inspection data comprises the grinding visual image and the grinding internal inspection data.

46. The method of claim 44, wherein said inspection to obtain the grinding inspection data is performed during said grinding operation and comprises inspecting the part with one of the infrared camera and an eddy current inspection module to obtain the grinding inspection data.

47. The method of claim 44, wherein said inspection to obtain the welding inspection data is performed during said welding operation and comprises obtaining at least one welding visual image of the part, the welding inspection data comprising the welding visual image.

48. The method of claim 44, wherein said inspection to obtain the welding inspection data is performed after said welding operation and comprises:

obtaining at least one welding visual image of the part, and inspecting the part with at least one of the x-ray imager, the infrared camera, an eddy current inspection module, and a fluorescent penetrant inspection (FPI) module to obtain a plurality of welding internal inspection data for the part, wherein said welding inspection data comprises the welding visual image and the welding internal inspection data.

49. The method of claim 44, wherein said inspection to obtain the reshaping inspection data is performed during said reshaping operation and comprises obtaining at least one reshaping visual image of the part, the reshaping inspection data comprising the reshaping visual image.

50. The method of claim 44, wherein said inspection to obtain the reshaping inspection data is performed after said reshaping operation and comprises:

obtaining at least one reshaping visual image of the part, and inspecting the part with at least one of the x-ray imager, the infrared camera, an eddy current inspection module, and a fluorescent penetrant inspection (FPI) module to obtain a plurality of reshaping internal inspection data for the part, wherein said reshaping inspection data comprises the reshaping visual image and the reshaping internal inspection data.

51. An inspection and sorting system for turbine blade repair comprising:

a machine vision sensor configured to obtain at least one visual image of a turbine blade, the turbine blade comprising an airfoil;

a computer configured to receive the visual image, to generate a repair profile for the part using the visual image, to access repair facility data and updated repair data, to revise a baseline using the repair facility data and the updated repair data, and to compare the repair profile with the baseline to arrive at a repair recommendation based on the repair facility data and the updated repair data.

52. The inspection and sorting system of claim 51, further comprising:

a digital x-ray imager configured to obtain at least one digital x-ray image of the turbine blade, wherein said computer is configured to analyze the digital x-ray image to generate the repair profile using the visual and digital x-ray images.

53. The inspection and sorting system of claim 51, further comprising:

an infrared camera configured to obtain an infrared image of the turbine blade; and an infrared image converter configured to digitize the infrared image to supply a digital infrared image to said computer, wherein said computer is configured to analyze the digital infrared image to generate the repair profile using the visual and digital infrared images.

54. The inspection and sorting system of claim 51, further comprising:

an eddy current inspection module configured to obtain a plurality of eddy current data for the turbine blade; and an eddy current converter configured to digitize the eddy current data to supply digital eddy current data to said computer, wherein said computer is configured to analyze the digital eddy current data to generate the repair profile using the visual and digital eddy current data.

55. The inspection and sorting system of claim 51, wherein the baseline comprises a historical repair database.

56. The inspection and sorting system of claim 51, wherein the baseline is obtained using a predictive repair model.

* * * * *